May 19, 1936.　　　T. W. SLUTZ　　　2,041,154
SHOCK ABSORBING DEVICE
Filed Nov. 28, 1932
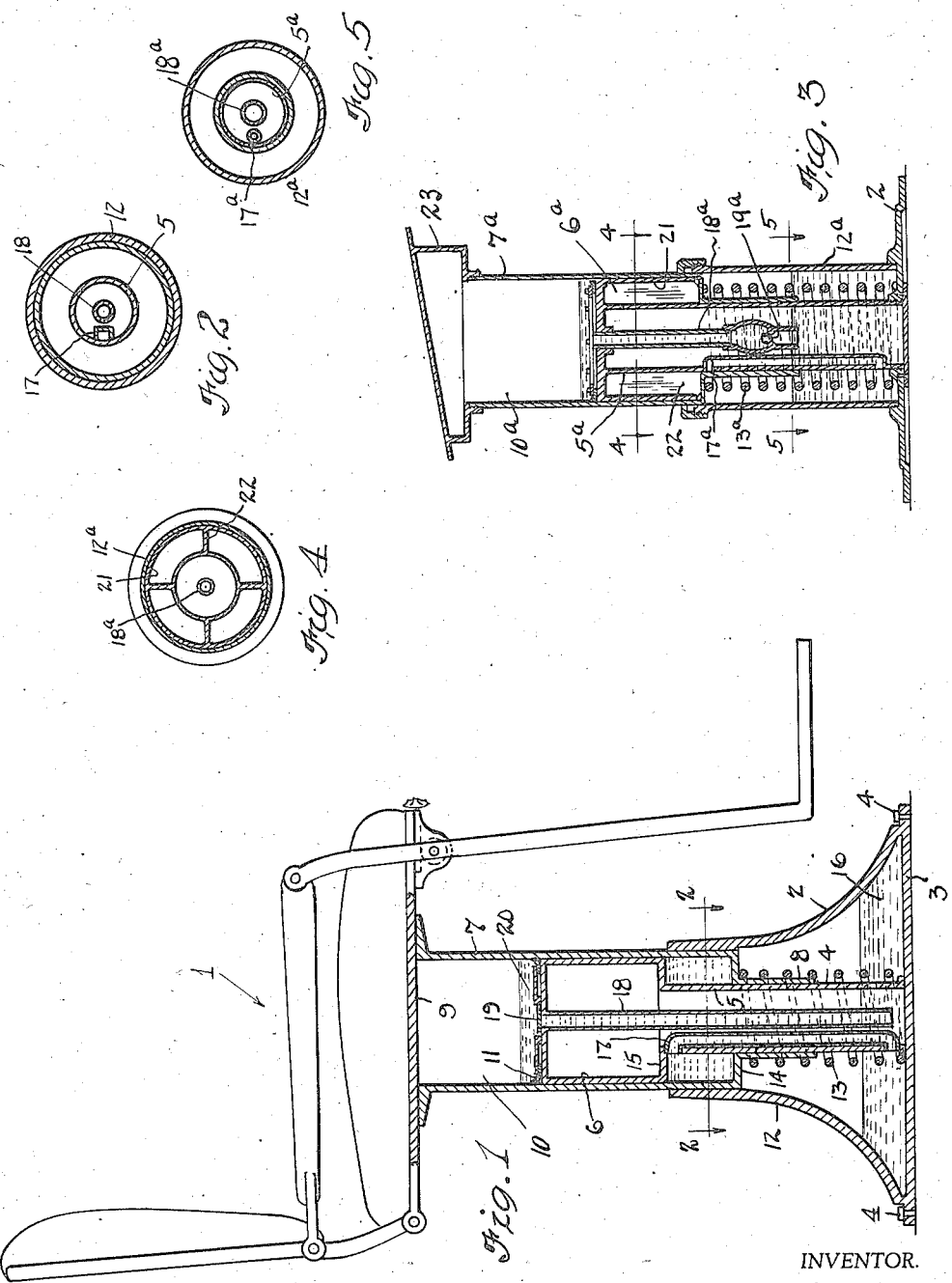
INVENTOR.
Thomas W. Slutz
BY
Day, Oberlin & Day
ATTORNEYS Patented May 19, 1936

2,041,154

UNITED STATES PATENT OFFICE 2,041,154

SHOCK ABSORBING DEVICE

Thomas W. Slutz, Cleveland, Ohio

Application November 28, 1932, Serial No. 644,606

8 Claims. (Cl. 267—34)

This invention relates as indicated to a shock absorbing device and has particular reference to a device adapted to connect two relatively movable elements in shockproof relationship. The device constructed according to the principles of my invention is particularly applicable for use as a supporting means for articles carried by vehicles such as the chairs or seats of omnibuses, railway coaches and the like and is generally applicable for use between two relatively movable parts so that the vibrations in one such part may not be transmitted to the other supported thereby.

It is among the objects of my invention to provide an apparatus for the above defined uses and which shall be able to perform such function in a manner superior to devices of this character as provided by the prior art. Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a vertical sectional view of one form of apparatus constructed in accordance with the principles of my invention; Fig. 2 is a transverse sectional view of the apparatus illustrated in Fig. 1 taken on a plane substantially indicated by the line 2—2; Fig. 3 is a vertical sectional view of a modified form of apparatus similar to that illustrated in Fig. 1; Fig. 4 is a transverse sectional view of the apparatus illustrated in Fig. 3 taken on a plane substantially indicated by the line 4—4; and Fig. 5 is a transverse sectional view of the apparatus illustrated in Fig. 3 taken on a plane substantially indicated by the line 5—5.

Referring now more specifically to the drawing and more especially to Fig. 1, the shock absorbing device herein illustrated as an embodiment of the principles of my invention is shown supporting a passenger seat generally indicated at 1, such seat being of the type which may be employed in omnibuses, railway coaches and the like and which forms no part of this invention and will, therefore, not be explained in greater detail.

The shock absorbing device supporting the seat 1 consists of a base generally indicated at 2 which may preferably be provided at its lower end with a flared portion 3 adapted to be secured by bolts 4 or otherwise to a suitable foundation. Fixedly mounted to the base 3 is an upwardly extending piston generally indicated at 4 which comprises a tubular stem 5 and an enlarged tubular head 6. Surrounding the piston 4 and particularly its head 6 and the upper portion of the stem 5 is a cylinder generally indicated at 7, which, at its lower end, is provided with a reduced portion 8 adapted to slidably engage the outer periphery of the stem 5. The upper end of the cylinder 7 is closed by means of a plate 9 having a fluid-tight connection with the walls of such cylinder trapping air or other suitable compressible fluid in the space 10 above the head 6 of the piston. The plate 9 may be employed to support a seat or any suitable device adapted to be supported by the apparatus comprising my invention.

The fluid entrapped in the space 10 is, as above indicated, compressible and will normally be under atmospheric pressure, i. e., when no load is being carried by the device but when a load is placed on the device, this fluid will be compressed in the manner hereinafter more fully explained to assist in resiliently supporting the load carried by the device.

The head 6 of the piston may be provided with a gasket 11 which insures a fluid-tight joint between the head 6 of the piston and the wall of the cylinder 7.

The base 2 extending upwardly in the form of a cylindrical wall generally indicated at 12 preferably has an internal diameter such that this portion of the base has sliding engagement with the cylinder 7, thereby affording lateral support for the cylinder 7 in this area and also insures that liquid within the base will not leak out from the confines of the base at this point.

The stem 5 of the piston is encompassed by a compression spring 13 which, at its lower end, bears against the stationary support 3 and at its upper end against the shoulder adjacent the reduced portion 8 of the cylinder 7. At this point, it may be well to note that the relation of the parts as shown in Fig. 1 is that which they would occupy if a load were placed upon the seat 1, i. e., the spring 13 is strong enough to force the cylinder 7 upwardly until the wall thereof at the reduced portion 14 engages the wall at the reduced portion 15 of the piston.

The confines of the base 2 of the device serves as a reservoir for oil, generally indicated at 16. The stem 5 of the piston 4 is provided with a conduit 17 which affords communication between the reservoir of oil 16 and the space between the lower end of the piston head 6 and the lower end of the cylinder 7, so that when the cylinder 7 is depressed, moving the walls 14 and 15 apart into a position such as is shown in Fig. 1 oil from the reservoir 16 may flow into this evacuated space.

A conduit 18 is provided which leads from the oil reservoir 16 through the head 6 of the piston. The upper end of the conduit in this particular construction is closed by a check valve generally indicated at 19 and as the parts are initially assembled, a small quantity of oil, generally indicated at 20, will be placed in the space in the cylinder above the head 6 of the piston.

The construction of modified and for some purposes the preferred device as illustrated in Fig. 3, is substantially identical with that illustrated in Fig. 1 so that like reference characters will be employed to designate like parts. The only major difference between the construction illustrated in Fig. 3 and the described construction illustrated in Fig. 1 resides in a somewhat different formation of the piston head 6a. In Fig. 3 the piston head is illustrated as provided with a depending skirt 21 and in contradistinction to the construction illustrated in Fig. 1, the stem 5a extends all the way up to the head plate of the piston. In order to reinforce the skirt, a plurality of ribs 22, most clearly illustrated in Fig. 4, are provided between the skirt 21 and the upper end of the piston rod 5a. The conduit 18a in the construction illustrated in Fig. 3 has the check valve generally indicated at 19a positioned at the lower end of such conduit instead of at its upper end. The only other major difference between the two constructions is that the cylinder 7a in Fig. 3 is, at its upper end, provided with a laterally extending enlargement generally indicated at 23 for the purpose hereinafter more fully explained.

The function and operation of the apparatus comprising my invention will first be explained by having reference to Fig. 1. As previously indicated, the position of the parts as shown in this figure is such as would maintain when a load, such as the weight of a passenger, is placed upon the seat 1. This load depresses the spring 13 and compresses the fluid in the space 10 until the combined resistance of such spring and compressed fluid is sufficient to balance the weight placed upon the device. This depression of the cylinder 7 causes the walls 14 and 15 to separate creating a vacuum in the space therebetween which causes the oil from the reservoir 16 to flow upwardly into such space through the conduit 17 provided for this purpose.

Assuming now that the vehicle on which such seat is mounted is driven over the usual highway surface, this movement of the vehicle will be reflected in the occurrence of a certain amount of vibration of the base 2, which the device comprising my invention is to prevent being transmitted to the seat or similar means carried thereby. All minor vibrations, i. e., those extending through a narrow range of movement, are all taken up by the combined resilient action of the spring 13 and the compressible fluid trapped in the space 10.

Assuming now that an obstruction of appreciable size is encountered by the vehicle which tends to quickly and sharply force the base 2 upwardly, this shock will now be absorbed by the spring 13 and the compressed fluid in the space 10 and also by the vacuum which is generated in the space between the walls 14 and 15. This vacuum is generated for the reason that the conduit 17 is of such constricted cross-sectional area that the liquid from the reservoir 16 cannot flow through the conduit 17 fast enough to maintain the space between walls 14 and 15 filled at all times during such sharp movement. For all sharp shocks, therefore, the spring and fluid compressed in the space 10 are augmented in their action by the vacuum generated between the lower end of the piston and the lower end of the cylinder. This partial vacuum, as above defined, is also of material assistance in preventing the re-coil of the shock which has just been described from being transmitted to the means carried by the device such as the seat. The first phase of the re-coil will be taken up by the vacuum space in the chamber between walls 14 and 15 and then further recoil is gradually snubbed by forcing the liquid from the space between the walls 14 and 15 back to the reservoir 16.

The construction, as illustrated in Fig. 3 provides a somewhat gerater space in which the snubbing liquid flows when the cylinder 7a is depressed by the load placed thereon. This added space facilitates the smoothness of the snubbing action above described in connection with the explanation of Figure 1 so that a smoother operation is secured by the employment of the construction illustrated in Figure 3 than is possible for certain uses of the apparatus as illustrated in Figure 1.

The lateral enlargement at 23 of the cylinder 7 provides an additional space for the compressible medium so that the piston may move closer to the upper end of the cylinder than is possible with a construction such as is illustrated in Fig. 1. The column of oil carried by the top of the pistons insures a liquid seal for the piston in the cylinder at all times. Should any of this liquid leak out, i. e., downwardly past the piston head, it would simply find its way into the reservoir; then when the spring returns the cylinder to its upper position, a partial vacuum is created in the space 10 or 10a and the conduits 18 and 18a return to the space 10 or 10a the amount of liquid which has leaked out. It is, therefore, apparent that after the parts are once assembled, there is no possibility of disarrangement occurring due to leakage between any of the relatively movable parts.

As previously indicated, the device comprising my invention is particularly applicable for use in supporting seats in omnibuses, trains, carriages and the like. It has also been found desirable to use this device as a supporting means for cots and beds in ambulances and the like where it is essential that no shock be transmitted from the running gear of the vehicle to the bed or cot supported in such vehicle. Certain changes might be made in the specific construction illustrated for purposes of explanation without departing from the principle of my invention. For instance, the form, size, shape and relation between the movable elements defining the two closed spaces which vary inversely upon relative movement of such elements may be changed to a certain extent without a change in the result secured so long as the fundamental principles of my construction are followed.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a shock absorbing device, the combination of relatively movable elements defining two spaces which vary inversely in size responsive to relative movement of said elements, a compressible fluid trapped in one of said spaces, a reservoir containing a liquid, a continuously open conduit for said liquid from said reservoir to the other of said spaces, and another conduit including a check valve leading from said first named space to said reservoir.

2. In a shock absorbing device, the combination of a cylinder closed at both ends, a double acting piston extending into said cylinder at one end, spring means urging said piston and cylinder relatively axially of one another, a liquid reservoir, conduits extending from said reservoir to the spaces defined by said piston and cylinder.

3. In a shock absorbing device, the combination of a cylinder closed at both ends, a double acting piston extending into said cylinder at one end, spring means urging said piston and cylinder relatively axially of one another, a liquid reservoir, conduits extending from said reservoir to the spaces defined by said piston and cylinder, and a check valve in one of said conduits.

4. In a shock absorbing device, the combination of a cylinder closed at both ends, a double acting piston extending into said cylinder at one end, spring means urging said piston and cylinder relatively axially of one another, a liquid reservoir, conduits extending from said reservoir to the spaces defined by said piston and cylinder, and a check valve in the conduit leading to the space at the head of said piston.

5. In a shock absorbing device, the combination of a fixed vertically extending double acting piston, a movable cylinder around said piston and extending upwardly therefrom, means closing the top of said cylinder and trapping therein a compressible fluid, a reservoir of liquid at the base of said piston, a conduit for such liquid from said reservoir to the space in said cylinder below the head of said piston, a conduit including a check valve extending from said reservoir to the space in said cylinder above the head of said piston, and spring means urging said cylinder upwardly axially of said piston.

6. In a shock absorbing device, a base; a piston having a head portion and a restricted stem portion fixedly mounted on said base; a cylinder encompassing said piston head and cooperating therewith, said cylinder having a closure at its upper end defining with the piston head an enclosed space, and a closure at its lower end through which the stem of piston passes in sliding engagement and which forms with the piston head a second enclosed space; a quantity of compressible fluid entrapped within the first of said spaces; a quantity of liquid filling the second of said spaces; a wall mounted on said base encompassing the lower portion of the stem of said piston and in sliding engagement with the outside wall of said cylinder enclosing a space between the lower closure of said cylinder and said base; a quantity of liquid partially filling said last named space; a conduit connecting the second said space within said cylinder with the last named said space whereby said liquid therewithin is transferred responsive to relative movement between said base and said cylinder; and resilient means within said base maintaining said cylinder in spaced relation therewith.

7. In a shock absorbing device, the combination of a cylinder having a closure for each end, a base having walls which slidably engage the outside walls of said cylinder and which define with the lower closure of said cylinder a closed space, a liquid within said space, resilient means within said base supporting said cylinder in spaced relation in respect thereto, a piston comprising a stem mounted on said base and a head within said cylinder, a quantity of compressible fluid entrapped within said cylinder above said piston head, a quantity of fluid filling the space in said cylinder between the said piston head and the lower closure through which the stem of said piston passes in close fitting engagement, and an open conduit between the said last mentioned space and the closed space in the said base, whereby fluid is transferred therebetween responsive to movement of said cylinder relative to said base.

8. In a shock absorbing device, the combination of an upright stationary element, a second element slidably mounted upon said first named element and defining therewith two enclosed spaces which vary inversely in size responsive to relative movement of said elements, a compressible fluid trapped above the said first-named element filling the upper of said spaces, a liquid entrapped within the second of said spaces, a reservoir of liquid below said second element, resilient means maintaining said second element in spaced relation with said reservoir of liquid, and a conduit providing unobstructed passage for liquid between said reservoir and said liquid entrapped within the second of said spaces.

THOMAS W. SLUTZ.